United States Patent
Reddy et al.

(10) Patent No.: US 10,476,892 B2
(45) Date of Patent: Nov. 12, 2019

(54) REPUTATION-BASED APPLICATION CACHING AND WHITE-LISTING

(71) Applicant: Juniper Networks, Inc., Sunnyvale, CA (US)

(72) Inventors: Khandi Sudhakar Reddy, Bangalore (IN); Rajeev Chaubey, Bangalore (IN); Srinivas Koripella, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 180 days.

(21) Appl. No.: 15/393,899

(22) Filed: Dec. 29, 2016

(65) Prior Publication Data

US 2018/0191743 A1 Jul. 5, 2018

(51) Int. Cl.
*H04L 29/06* (2006.01)
*G06N 20/00* (2019.01)

(52) U.S. Cl.
CPC ......... *H04L 63/1408* (2013.01); *G06N 20/00* (2019.01); *H04L 63/0227* (2013.01)

(58) Field of Classification Search
CPC .................................................. H04L 63/1408
See application file for complete search history.

(56) References Cited

U.S. PATENT DOCUMENTS

| | | | |
|---|---|---|---|
| 2014/0090058 A1* | 3/2014 | Ward | H04L 63/1433 726/23 |
| 2014/0201528 A1* | 7/2014 | Krig | H04L 67/22 713/168 |
| 2015/0256431 A1 | 9/2015 | Buchanan et al. | |
| 2016/0269430 A1 | 9/2016 | Laswell et al. | |
| 2017/0078922 A1* | 3/2017 | Raleigh | H04W 28/10 |
| 2017/0339097 A1* | 11/2017 | Simon | H04W 76/10 |

OTHER PUBLICATIONS

CVE Details, "CVE-2013-5663," http://www.cvedetails.com/cve/CVE-2013-5663/, Sep. 30, 2013, 2 pages.
Juniper Networks, "Understanding Application Identification Techniques," http://www.juniper.net/techpubs/en_US/junos15.1x49/topics/concept/services-application-identification-techniques-understanding.html, Nov. 14, 2015, 2 pages.
Juniper Networks, "Understanding the Application System Cache," http://www.juniper.net/techpubs/en_US/junos15.1x49/topics/concept/services-application-system-cache-understanding.html, Nov. 14, 2015, 1 page.
Extended European Search Report corresponding to EP 17163989.1 dated Jul. 19, 2017, 8 pages.

* cited by examiner

*Primary Examiner* — Simon P Kanaan
(74) *Attorney, Agent, or Firm* — Harrity & Harrity, LLP

(57) ABSTRACT

A device may classify an application, associated with an endpoint, based on traffic associated with the endpoint. The device may determine a reputation score associated with the endpoint. The reputation score may be indicative of a level of trustworthiness of the endpoint. The device may selectively store a classification result, associated with classifying the application, in an application cache based on the reputation score associated with the endpoint. The classification result may be selectively used to process further traffic associated with the endpoint.

20 Claims, 9 Drawing Sheets

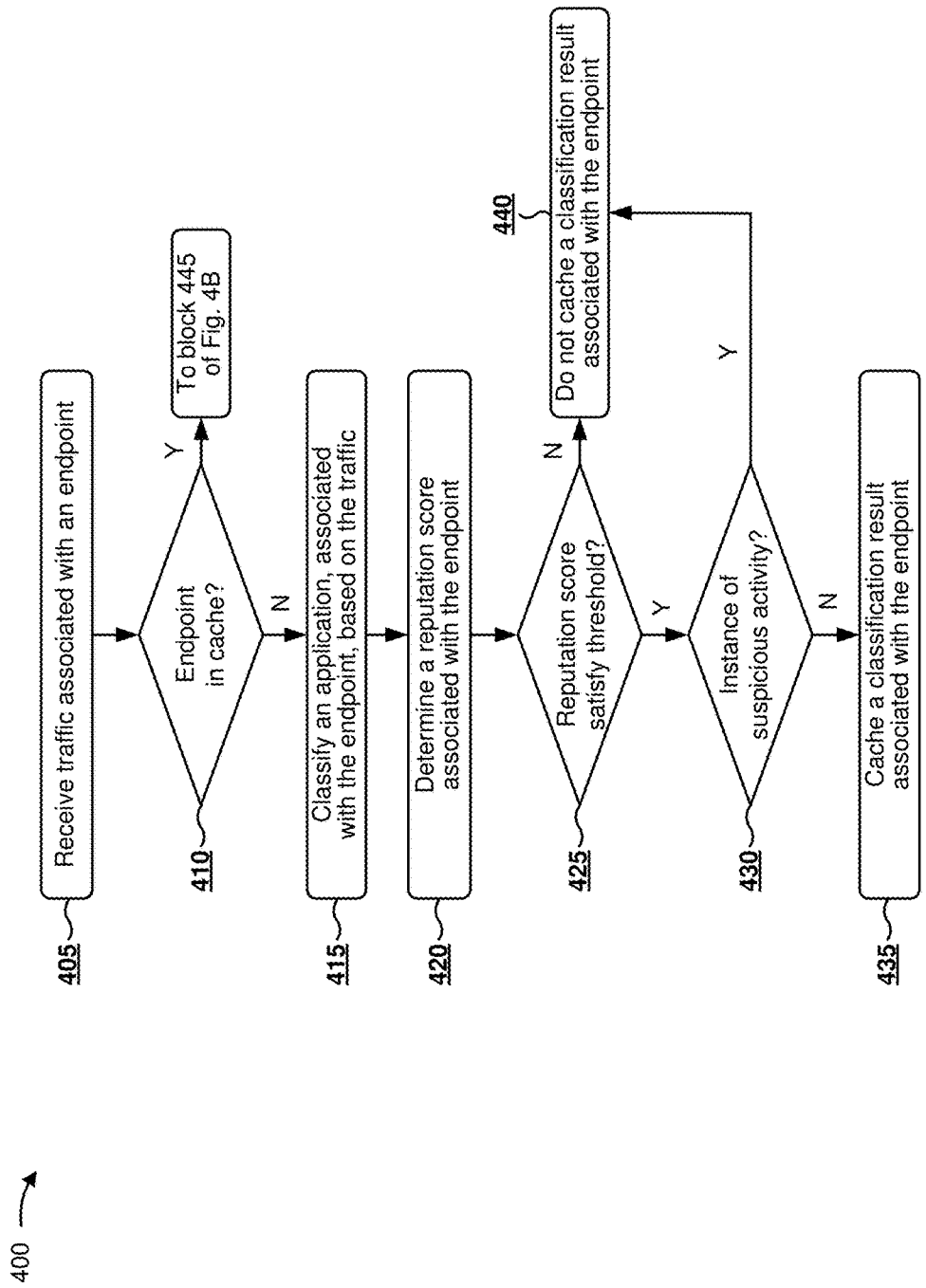

US 10,476,892 B2

REPUTATION-BASED APPLICATION CACHING AND WHITE-LISTING

BACKGROUND

A security device may be configured to provide a security service (e.g., a next-generation firewall service, a unified threat management service, an advanced threat protection service, or the like) for inspecting (e.g., using a deep packet inspection (DPI) technique) traffic, associated with a session between a client device and a server device in order to classify and/or identify an application associated with the session. The security device may determine, based on classifying and/or identifying the application, a rule set (i.e., a security policy) that describes a manner in which the traffic is to be processed.

SUMMARY

According to some possible implementations, a device may include one or more processors to: classify an application, associated with an endpoint, based on traffic associated with the endpoint; determine a reputation score associated with the endpoint, where the reputation score may be indicative of a level of trustworthiness of the endpoint; and selectively store a classification result, associated with classifying the application, in an application cache based on the reputation score associated with the endpoint, where the classification result may be selectively used to process further traffic associated with the endpoint.

According to some possible implementations, a non-transitory computer-readable medium may store instructions that, when executed by one or more processors, cause the one or more processors to: identify, based on traffic associated with an endpoint of a session, a classification result, included in an application cache, that includes information that identifies the endpoint, where the classification result may include information that identifies an application associated with the endpoint; determine, based on identifying the classification result, that the application is to be re-classified; re-classify the application based on determining that that the application is to be re-classified; and selectively remove the classification result from the application cache based on re-classifying the application.

According to some possible implementations, a method may include classifying, by a device, an application, associated with an endpoint, based on traffic associated with the endpoint; determining, by the device, a reputation score, associated with the endpoint, that includes information that is indicative of a level of trustworthiness of the endpoint; comparing, by the device, the reputation score and a reputation threshold; and selectively: storing a classification result, associated with classifying the application, in an application cache when the reputation score satisfies the reputation threshold; or discarding the classification result when the reputation score does not satisfy the reputation threshold.

BRIEF DESCRIPTION OF THE DRAWINGS

FIGS. 4A and 4B are flow charts of an example process for selectively caching a classification result to a reputation-based application cache and/or selectively using a cached classification result included in the reputation-based application cache.

DETAILED DESCRIPTION

Figure 1A:
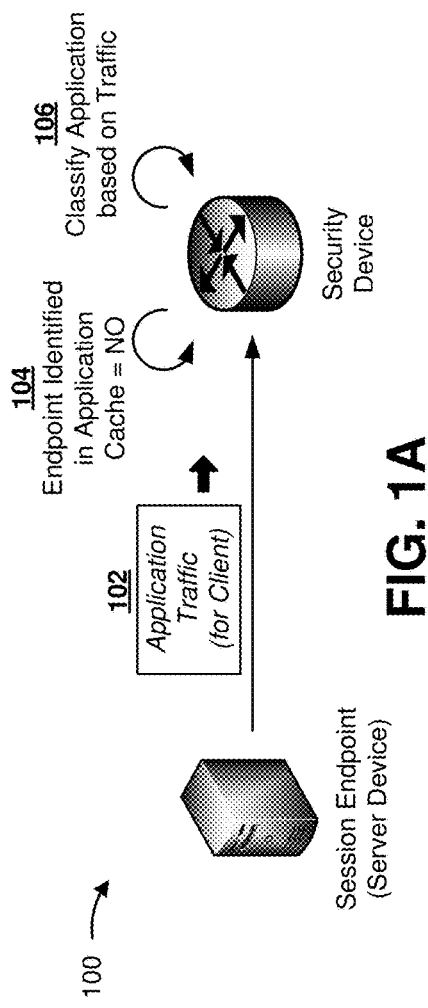
FIGS. 1A-1G are diagrams of an overview of an example implementation described herein.

The following detailed description of example implementations refers to the accompanying drawings. The same reference numbers in different drawings may identify the same or similar elements.

In some cases, a result of classifying and/or identifying an application (herein referred to as a classification result), based on traffic associated with a session, may be cached (i.e., stored) by a security device. In some implementations, the classification result may include information that identifies an endpoint associated with the session, such as a network address (e.g., an Internet protocol (IP) address) associated with an endpoint (e.g., a server device, a client device), a port associated with the endpoint, information that identifies a transport protocol associated with the traffic, information that identifies the application (e.g., an application type, an application identifier, such as a uniform resource locator (URL) or an application name), or the like.

When the security device receives other traffic (e.g., associated with another session) at a later time, the security device may identify an endpoint associated with the other traffic, and query the cached classification results in order to determine whether an endpoint, identified by a cached classification result, matches the endpoint associated with the other traffic. If a match is found, then the security device may identify and/or classify the application based on the cached classification result, and proceed with applying the appropriate security service (i.e., without classifying the application based on the other traffic).

Similarly, the security device may have access to a "white-list" that includes information that identifies a set of approved and/or trusted endpoints. Here, upon receiving traffic associated with a session, the security device may identify an endpoint associated with the session. The security device may then determine if the endpoint is identified in the white-list. If so, the security device may, in some cases, allow the traffic to bypass inspection (e.g., since the endpoint is deemed trustworthy).

However, the cache of classification results (sometimes referred to as an application cache) may be vulnerable to cache poisoning when, for example, an attacker causes an invalid classification result to be cached, thereby potentially allowing the attacker to bypass application of a particular security service to potentially harmful traffic. Thus, relying on the application cache may reduce network security and/or increase vulnerability to attack. However, disabling such caching may result in increased resource usage and/or less efficient operation of the security device, as described above.

Similarly, with respect to a white-list, endpoints identified by the white-list may not be frequently updated and/or checked (e.g., at a later time) in order to determine whether the endpoint remains trustworthy. As such, if an end point identified in the white-list becomes less secure over time, traffic, associated with the endpoint, may be allowed to bypass inspection, thereby facilitating an attack.

Implementations described herein provide a security device capable of managing a reputation-based application cache that includes a set of classification results approved for caching based on reputations of endpoints associated with the set of classification results. The reputation-based application cache reduces vulnerability of the application cache to cache poisoning without negatively impacting a performance of the security device.

In some implementations, the security device may determine information associated with a reputation of an endpoint, associated with a classification result, in order to determine whether the classification result should be added to the application cache, used to identify and/or classify the application, and/or removed from the cache, as described below.

Similarly, implementations described herein may provide a security device capable of managing a reputation-based white-list that includes information that identifies a set of trusted endpoints deemed trustworthy based on reputations of the set of endpoints. The reputation-based white-list checking reduces vulnerability resulting from use of the white-list.

Figure 1B:
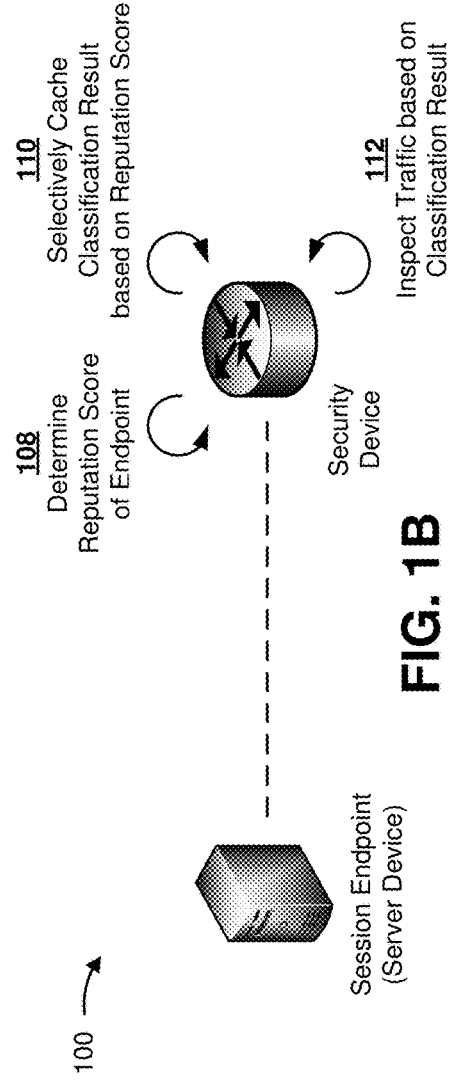

FIGS. 1A-1G are diagrams of overviews of example implementations 100, 120, 140, and 160 associated with managing an application cache, as described herein. FIGS. 1A and 1B show a first example implementation 100 associated with managing an application cache.

As shown by reference number 102 in FIG. 1A, a security device receives traffic, associated with an application, provided by an endpoint (e.g., a server device providing application traffic to a client device) associated with a session (e.g., a session between the server device and a client device (not shown)). As shown by reference number 104, the security device may determine that the endpoint is not identified in an application cache including a set of classification results.

An application cache may include a set of classification results associated with identifying and/or classifying a set of applications associated with a set of endpoints. A classification result may include information that identifies an endpoint associated with a session, a port associated with the endpoint, information that identifies a transport protocol associated with traffic of the session, information associated with an application, or the like. In some implementations, the classification result may be used to determine a rule set (i.e., a security policy) that describes a manner in which the traffic is to be processed and/or inspected.

As shown by reference number 106, since the endpoint is not identified in the application cache, the security device may classify the application, associated with the endpoint, based on the traffic. In some implementation, the security device may classify the application based on inspecting the traffic in order to determine information included in the traffic, and identify and/or classify the application based on this information. In some implementations, the security device may identify and/or classify the application in another manner, such as based on a classification algorithm.

As shown in FIG. 1B, and by reference number 108, the security device may determine a reputation score, associated with the endpoint, based on identifying and/or classifying the application associated with the endpoint. The reputation score may include information that identifies a relative reputation (i.e., a degree of trustworthiness) of the endpoint associated with the session.

As shown by reference number 110, the security device may then selectively cache the classification result based on the reputation score. For example, in some implementations, the security device may determine whether the reputation score satisfies a reputation threshold. The reputation threshold may indicate a level of trustworthiness to permit the classification result associated with the endpoint to be cached. Here, if the reputation threshold is satisfied, then the security device may cache the classification result for later use. Alternatively, if the reputation threshold is not satisfied, then the security device may not cache the classification result, and the application, associated with the endpoint, may be re-classified for a future traffic flow associated with the endpoint.

In some implementations, the security device may determine, based on the classification result, a security service to be applied to and process the traffic (e.g., regardless of whether the classification result is cached). As shown by reference number 112, the security device may then inspect the traffic in accordance with the security service.

In some implementations, the security device may selectively cache the classification result based on one or more other factors, such as based on whether an instance of suspicious activity, associated with the endpoint, has occurred, as described below.

Figure 1C:
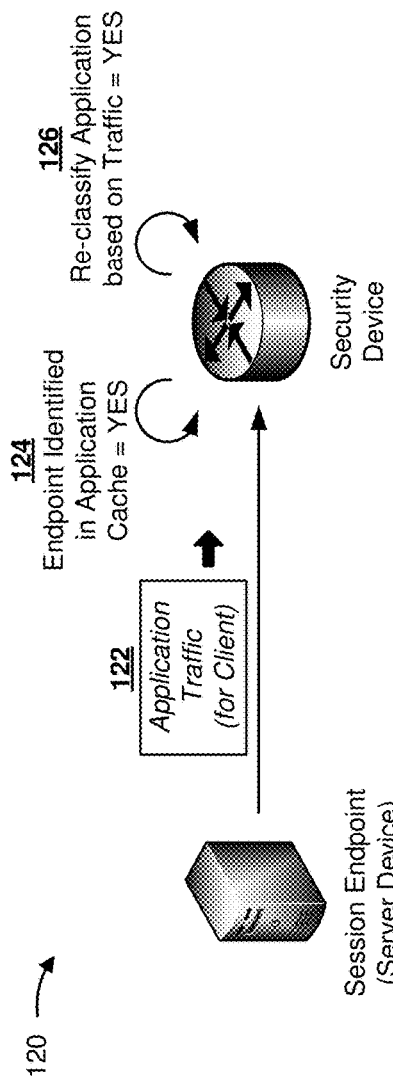
Figure 1D:
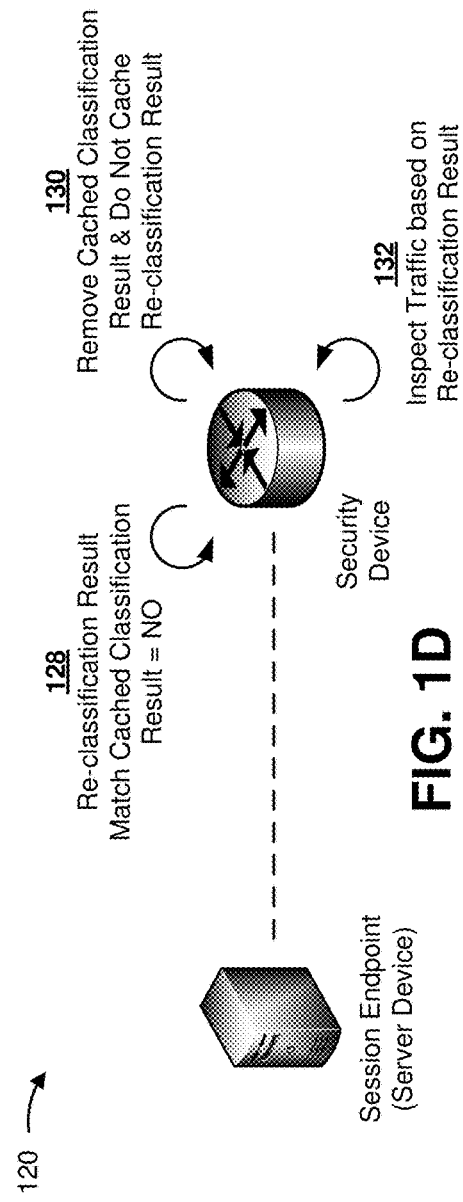

FIGS. 1C and 1D show a second example implementation 120 associated with managing an application cache, as described herein. Reference number 122 is analogous to reference number 102, in which the security device receives traffic, associated with an application, provided by an endpoint (e.g., a server device providing application traffic to a client device) associated with a session. As shown by reference number 124, the security device may determine that the endpoint is identified in the application cache.

As shown by reference number 126, the security device may determine, based on identifying the endpoint in the application cache, that the application, associated with the endpoint, is to be re-classified, and may re-classify the application accordingly.

For example, the security device may determine whether sufficient resources are available to re-classify the application (e.g., based on a resource threshold associated with the security device). Here, if sufficient resources are not available to re-classify the application, then the security device may determine whether a classification threshold, associated with classifying the application, is satisfied. If the classification threshold is satisfied, then the security device may determine whether a random and/or periodic re-classification is to be performed. In some implementations, the security device may re-classify the application, associated with the endpoint, if sufficient resources are available, the classification threshold is not satisfied, or the random and/or periodic re-classification is to be performed.

As shown in FIG. 1D, and by reference number 128, the security device may determine that the re-classification result does not match the cached classification result. For example, the security device may compare the re-classification result with the cached classification result (e.g., comparing information that identifies the application and/or application type in each result). The security device may determine that the re-classification result does not match the cached classification result when, for example, the information that identifies the application and/or the application type is not the same in the cached classification result and the re-classification result.

As shown by reference number 130, since the re-classification result does not match the cached classification result, the security device may remove the cached classification result, associated with the endpoint, and may not cache the re-classification result (e.g., in order to cause the security device to newly classify applications for each traffic flow associated with the endpoint). As shown by reference number 132, the security device may then determine, based on the re-classification result, a security service to apply to the traffic and inspect and/or process the traffic accordingly.

Figure 1E:
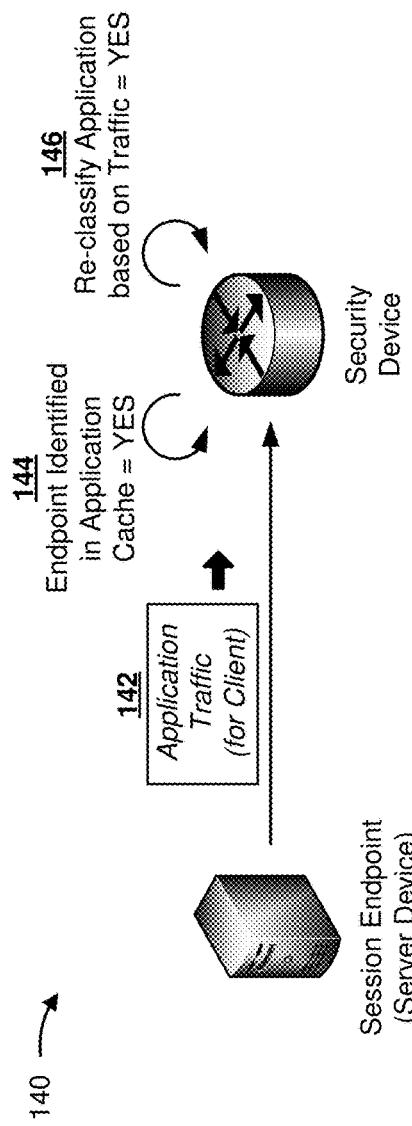
Figure 1F:
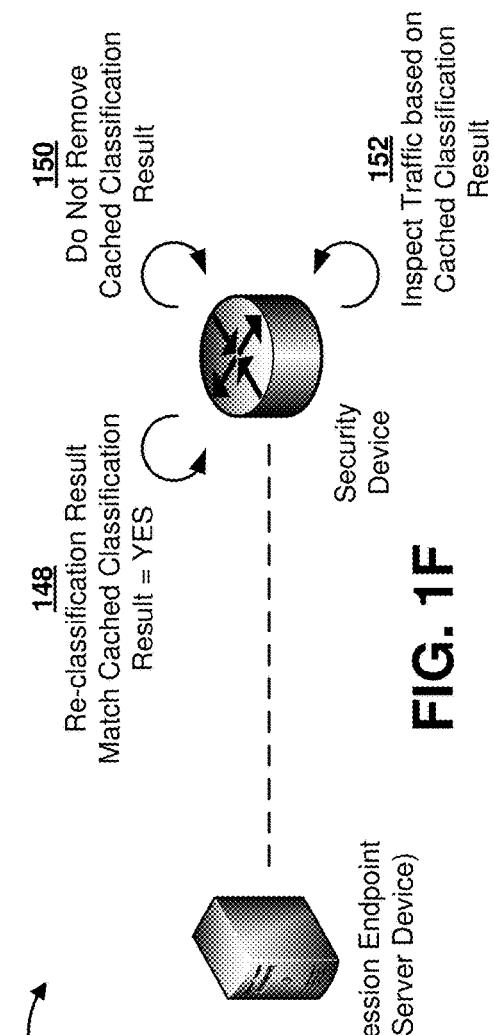

FIGS. 1E and 1F show a third example implementation 140 associated with managing an application cache, as described herein. Reference numbers 142-146 of FIG. 1E are analogous to reference numbers 122-126 as described above with regard to FIG. 1C.

As shown in FIG. 1F, and by reference number 148, the security device may determine that the re-classification result matches the cached classification result. As shown by reference number 150, since the re-classification result matches the cached classification result, the security device may allow the cached classification result to remain in the application cache (i.e., the security device does not remove the cached classification result). As shown by reference number 152, the security device may determine, based on the cached classification result, a security service to apply to the traffic, and may process and/or inspect the traffic accordingly.

Figure 1G:
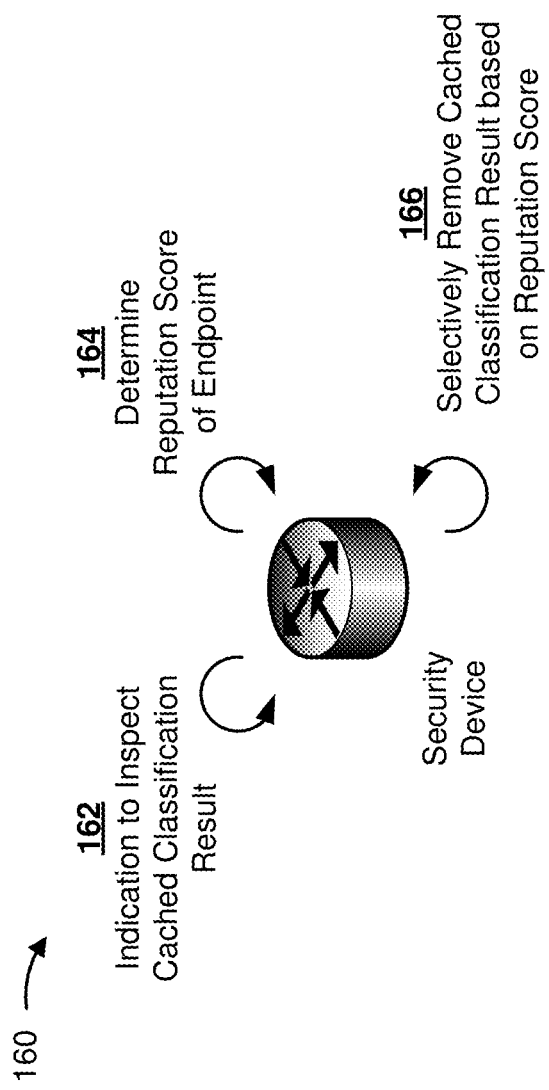

FIG. 1G is a fourth example implementation 160 associated with managing an application cache, as described herein. As shown by reference number 162, the security device may receive an indication to inspect a cached classification result (e.g., in order to determine whether the result is to be removed from the application cache). In some implementations, the indication may be based on a timer associated with the cached classification result, the endpoint, and/or a reputation of the endpoint. Additionally, or alternatively, the security device may randomly select the cached classification result for inspection, or receive an indication based on user input.

As shown by reference number 164, the security device may determine a reputation score of the endpoint associated with the cached classification result (e.g., in the manner described above). As shown by reference number 166, the security device may selectively remove the cached classification result based on the reputation score. For example, in some implementations, the security device may determine whether the reputation score satisfies the threshold (e.g., in the manner described above). If the reputation score satisfies the reputation threshold, then the security device may allow the cached classification result to remain in the cache (e.g., in order to use the cached classification result at a later time). Alternatively, if the reputation score does not satisfy the reputation threshold, then the security device may remove the cached classification result from the application cache. In some implementations, the security device may determine whether the reputation score has change (e.g., in a negative manner, in a positive manner) and determine whether to proceed based on whether the reputation score has changed (e.g., by any amount, by a threshold amount). The security device may also determine that an instance of suspicious activity has occurred, as described above, and remove the cached classification result based on such a determination.

In this way, a security device may manage a reputation-based application cache that includes a set of classification results approved for caching based on reputations of endpoints associated with the set of classification results. The reputation-based application cache reduces vulnerability of the application cache to cache poisoning without negatively impacting a performance of the security device. In some implementations, the security device may determine information associated with a reputation of an endpoint, associated with a classification result, in order to determine whether the classification result should be added to the application cache, used to identify and/or classify the application, or removed from the application cache.

As indicated above, FIGS. 1A-1G are provided merely as examples. Other examples are possible and may differ from what was described with regard to FIGS. 1A-1G.

Figure 2:
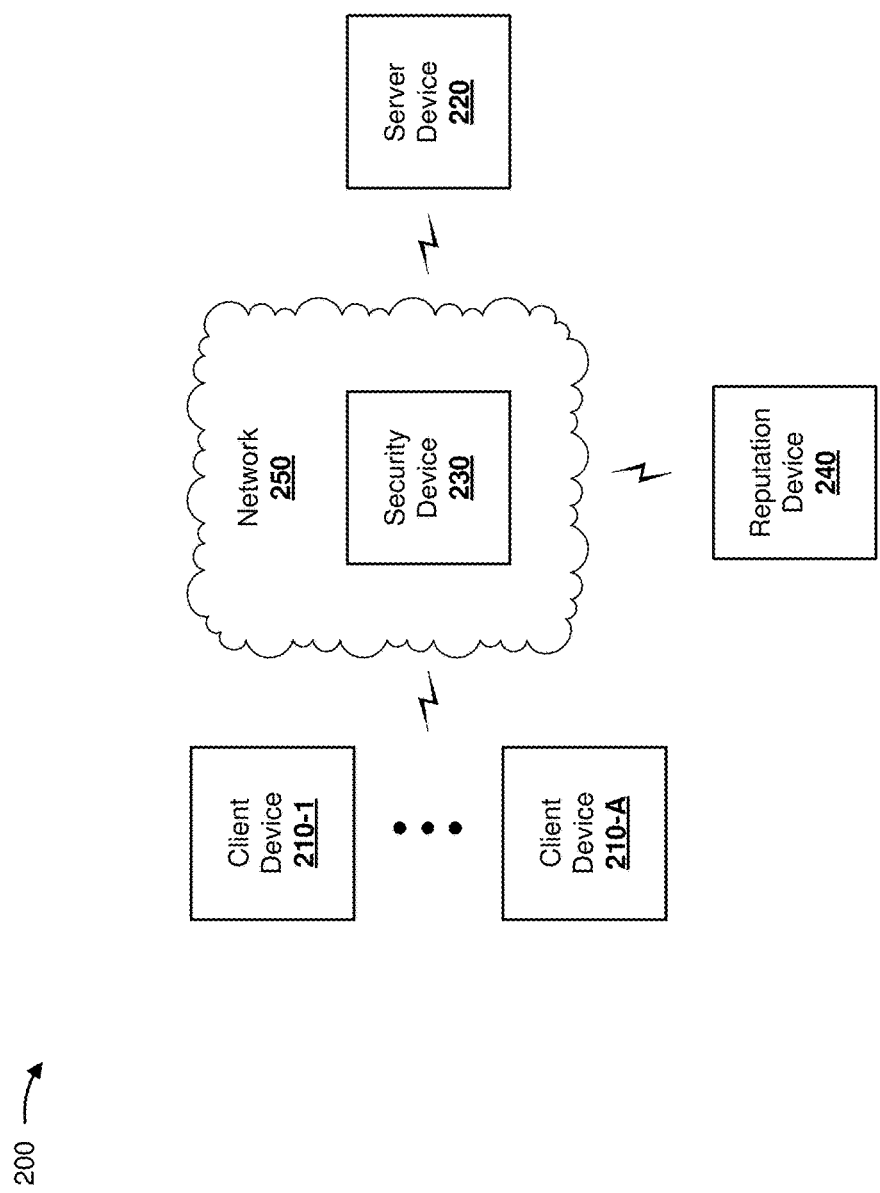
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210-1 through client device 210-A (A≥1) (herein referred to collectively as client devices 210, and individually as client device 210), a server device 220, a security device 230, a reputation device 240, and a network 250. Devices of environment 200 may interconnect via wired connections, wireless connections, or a combination of wired and wireless connections.

Client device 210 includes one or more devices capable of receiving, processing, and/or providing traffic associated with session between client device 210 and server device 220. For example, client device 210 may include a computing device, such as a laptop computer, a tablet computer, a handheld computer, a desktop computer, a mobile phone (e.g., a smart phone, a radiotelephone, etc.), a personal digital assistant, a network device (e.g., a router, a gateway, a firewall, a hub, a bridge, etc.), or a similar device. In some implementations, client device 210 may be an endpoint of the session.

Server device 220 includes one or more devices capable of hosting a resource (e.g., an application, a web page, a service, or the like) for access by client device 210 via a session associated with server device 220 and client device 210. For example, server device 220 may include a server or a group of servers. In some implementations, server device 220 may be capable of receiving, storing, processing, and/or providing traffic via the session associated with client device 210. In some implementations, server device 220 may act as an endpoint of the session.

Security device 230 includes one or more devices capable of managing a reputation-based application cache and/or a reputation-based white-list, as described herein, and processing, inspecting, forwarding, and/or transferring traffic associated with the session between client device 210 and server device 220. For example, security device 230 may include a router (e.g., a label switching router (LSR), a label edge router (LER), an ingress router, an egress router, a provider router, etc.), a gateway, a switch, a firewall, a hub, a bridge, a reverse proxy, a server (e.g., a proxy server), a security device, an intrusion detection device, a load balancer, or any traffic transfer device.

Reputation device 240 includes one or more devices capable of receiving, determining, storing, processing, and/or providing information associated with a reputation of an endpoint of a session (e.g., client device 210 and/or server device 220). For example, reputation device 240 may include a server or a group of servers.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
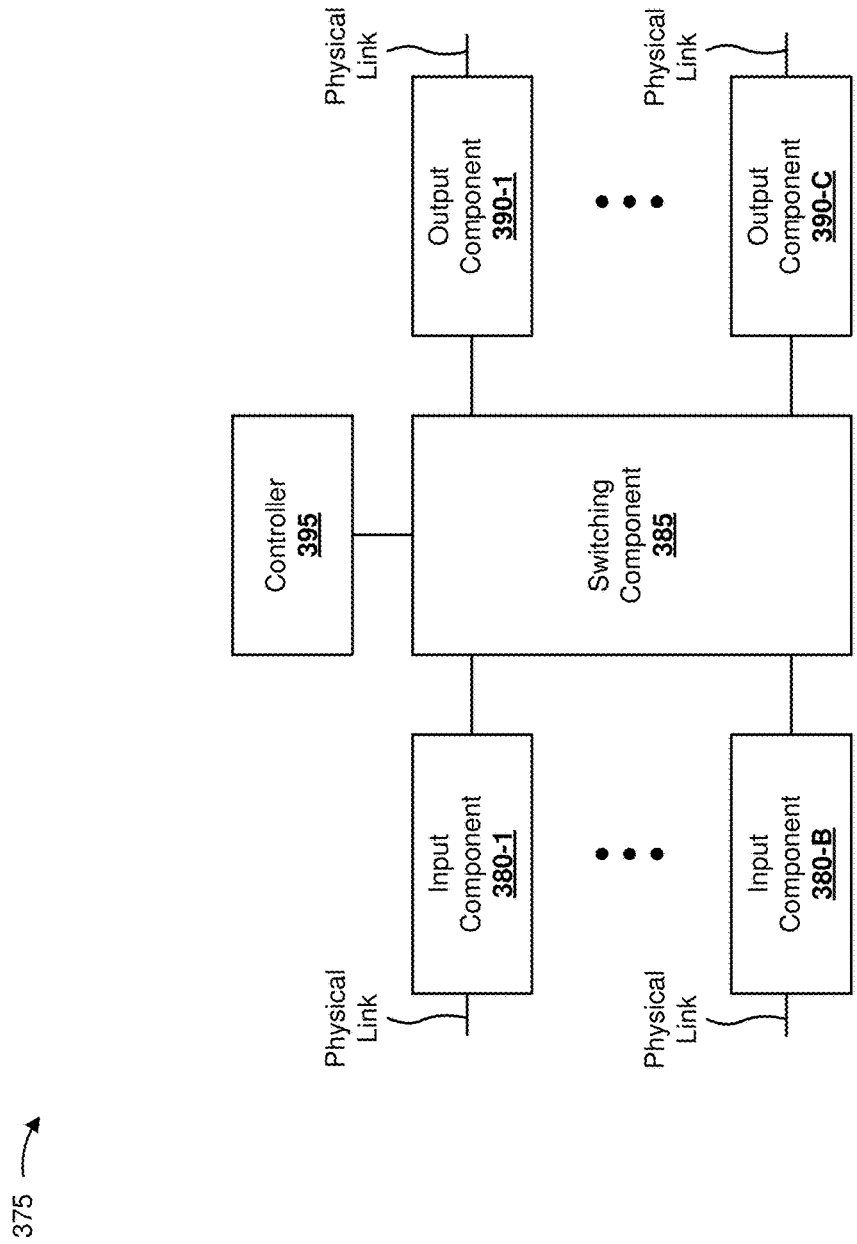
FIG. 3 is a diagram of example components of one or more devices of FIG. 2.

FIG. 3 is a diagram of example components of a device 375. Device 375 may correspond to security device 230. In some implementations, security device 230 may include one or more devices 375 and/or one or more components of device 375. As shown in FIG. 3, device 375 may include one or more input components 380-1 through 380-B (B≥1) (hereinafter referred to collectively as input components 380, and individually as input component 380), a switching component 385, one or more output components 390-1 through 390-C (C≥1) (hereinafter referred to collectively as output components 390, and individually as output component 390), and a controller 395.

Input component 380 may be points of attachment for physical links and may be points of entry for incoming traffic, such as packets. Input component 380 may process incoming traffic, such as by performing data link layer encapsulation or decapsulation. In some implementations, input component 380 may send and/or receive packets. In some implementations, input component 380 may include an input line card that includes one or more packet processing components (e.g., in the form of integrated circuits), such as one or more interface cards (IFCs), packet forwarding components, line card controller components, input ports, processors, memories, and/or input queues. In some implementations, device 375 may include one or more input components 380.

Switching component 385 may interconnect input components 380 with output components 390. In some implementations, switching component 385 may be implemented via one or more crossbars, via busses, and/or with shared memories. The shared memories may act as temporary buffers to store packets from input components 380 before the packets are eventually scheduled for delivery to output components 390. In some implementations, switching component 385 may enable input components 380, output components 390, and/or controller 395 to communicate.

Output component 390 may store packets and may schedule packets for transmission on output physical links. Output component 390 may support data link layer encapsulation or decapsulation, and/or a variety of higher-level protocols. In some implementations, output component 390 may send packets and/or receive packets. In some implementations, output component 390 may include an output line card that includes one or more packet processing components (e.g., in the form of integrated circuits), such as one or more IFCs, packet forwarding components, line card controller components, output ports, processors, memories, and/or output queues. In some implementations, device 375 may include one or more output components 390. In some implementations, input component 380 and output component 390 may be implemented by the same set of components (e.g., and input/output component may be a combination of input component 380 and output component 390).

Controller 395 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. A processor is implemented in hardware, firmware, or a combination of hardware and software. In some implementations, controller 395 may include one or more processors that can be programmed to perform a function.

In some implementations, controller 395 may include a random access memory (RAM), a read only memory (ROM), and/or another type of dynamic or static storage device (e.g., a flash memory, a magnetic memory, an optical memory, etc.) that stores information and/or instructions for use by controller 395.

In some implementations, controller 395 may communicate with other devices, networks, and/or systems connected to device 375 to exchange information regarding network topology. Controller 395 may create routing tables based on the network topology information, create forwarding tables based on the routing tables, and forward the forwarding tables to input components 380 and/or output components 390. Input components 380 and/or output components 390 may use the forwarding tables to perform route lookups for incoming and/or outgoing packets.

Controller 395 may perform one or more processes described herein. Controller 395 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 395 from another computer-readable medium or from another device via a communication interface. When executed, software instructions stored in a memory and/or storage component associated with controller 395 may cause controller 395 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 375 may include additional components, fewer components, different components, or differently arranged components than those shown in FIG. 3. Additionally, or alternatively, a set of components (e.g., one or more components) of device 375 may perform one or more functions described as being performed by another set of components of device 375.

Figure 4B:
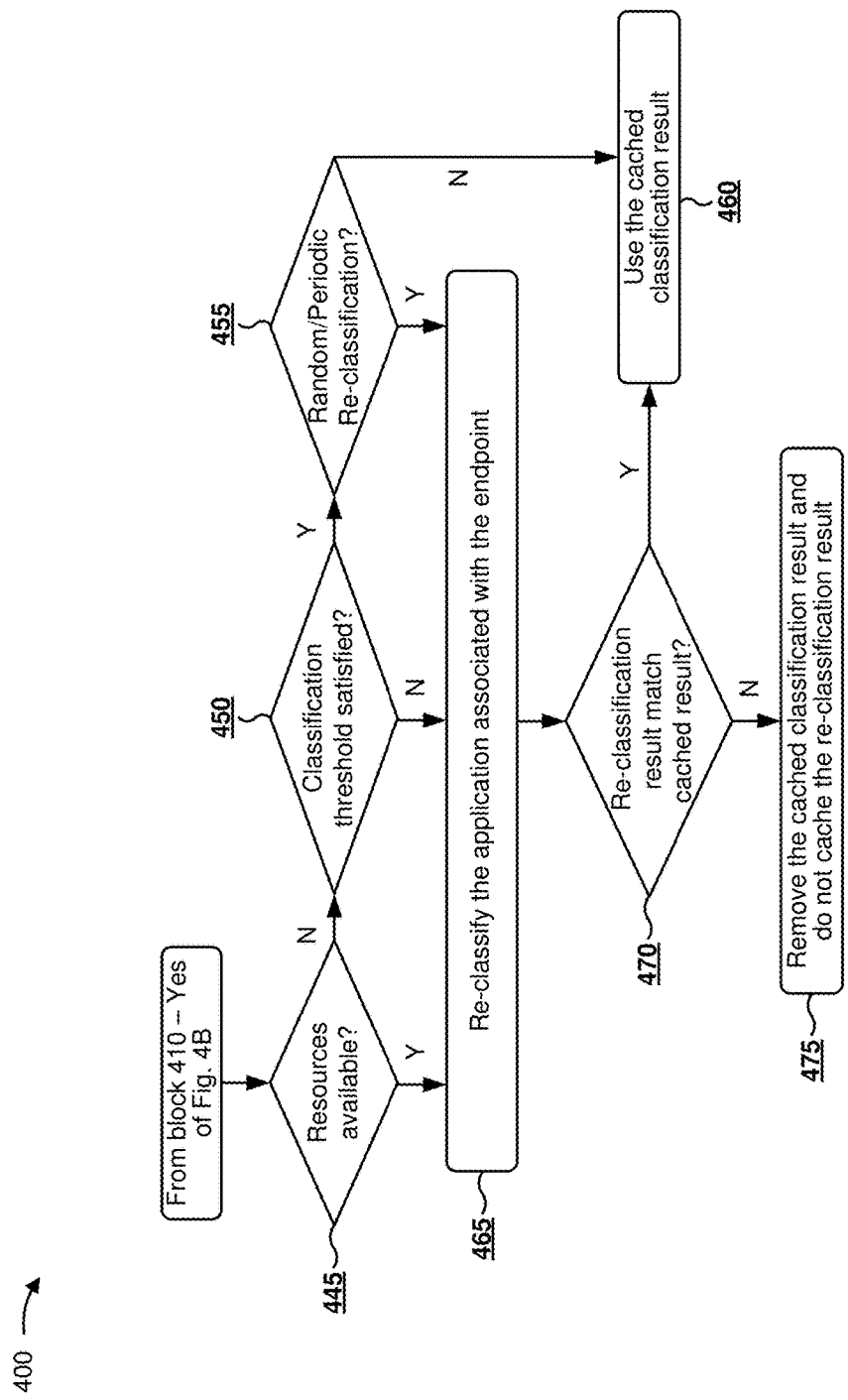

FIGS. 4A and 4B are flow charts of an example process 400 for selectively caching a classification result to a reputation-based application cache and/or selectively using a cached classification result included in the reputation-based application cache. In some implementations, one or more process blocks of process 400 may be performed by security device 230. In some implementations, one or more process blocks of process 400 may be performed by another device or a group of devices separate from or including security device 230, such as client device 210, server device 220, and/or reputation device 240.

As shown in FIG. 4A, process 400 may include receiving traffic associated with an endpoint of a session (block 405).

For example, security device 230 may receive traffic (e.g., a stream of data packets), from client device 210 or server device 220.

In some implementations, security device 230 may determine information that identifies the endpoint, associated with the session, based on the traffic. For example, in receiving traffic from server device 220 directed to client device 210, security device 230 may identify the endpoint of the session (i.e., server device 220) based on information included in the traffic, such as a packet header, network address (e.g., an IP address), port identifier (e.g., a port number), or the like. Notably, while techniques described herein are described in the context of server device 220 being the endpoint associated with classifying an application, these techniques may equally apply in the context of client device 210 being the endpoint associated with classifying the application.

As further shown in FIG. 4A, process 400 may include determining whether the endpoint is identified in an application cache (block 410). For example, security device 230 may determine whether the endpoint is identified in an application cache when server device 220 receives the traffic and identifies the endpoint associated with the session.

The application cache may include a set of classification results associated with identifying and/or classifying a set of applications associated with a set of endpoints. In some implementations, a classification result may include information that identifies an endpoint associated with a session (e.g., an IP address), information that identifies a port associated with an endpoint (e.g., a port number), information that identifies a transport protocol associated with traffic of the session, information associated with an application (e.g., a type of application, an application name), or the like. As described above, the classification result may be used to determine a manner in which one or more security services are to be applied to the traffic.

In some implementation security device 230 may search the application cache using information that identifies the endpoint associated with the traffic, in order to determine whether the endpoint is identified in a classification result included in the cache. For example, security device 230 may search the application cache using the information that identifies the session endpoint (e.g., a network address).

As further shown in FIG. 4A, if the endpoint is not identified in the application cache (block 410—NO), then process 400 may include classifying an application, associated with the endpoint, based on the traffic (block 415).

In some implementations, security device 230 may classify the application based on inspecting the traffic. For example, security device 230 may implement a deep packet inspection (DPI) technique to determine information included in the traffic, and then may identify and/or classify the application based on this information. As a particular example, security device 230 may have information associated with a set of application signatures, where each signature is associated with a particular application and/or a type of application and includes information defining the application signature, such as a sequence of bits (e.g., header bits, payload bits, or a combination of header and payload bits), that is unique to traffic associated with the application and/or application type (e.g., a sequence of bits that may be included in a given packet associated with the application). Here, security device 230 may inspect the first packet of traffic, and may determine a sequence of bits included in the first packet. Security device 230 may then determine whether the sequence of bits from the first packet matches a sequence of bits associated with the application signature.

If the sequence of bits from the first packet matches the sequence of bits associated with the application signature, then security device 230 may determine a classification result that includes the information described above. If the sequence of bits from the first packet does not match the sequence bits associated with the application signature, then security device 230 may inspect another packet (e.g., a second packet), repeating the process.

In some implementations, security device 230 may attempt to identify and/or classify the application for a threshold amount of time (e.g., 1 second, 10 seconds) or based on inspecting a threshold amount of packets (e.g., a first 20 packets, a first 100 packets) or the like. If security device 230 is unable to classify and/or identify the application, then security device 230 may be unable to determine or cache a classification result.

In some implementations, security device 230 may identify and/or classify the application algorithmically, or in another manner. For example, an algorithm may receive as input, information associated with the traffic, and provide as output, information that identifies the application or type of application based on which the application may be classified.

As another example, security device 230 may identify and/or classify the application based on a model. For example, security device 230 may train a model to classify an application based on information from traffic associated with the application. Here, security device 230 may use the model to classify the application. In such a case, the model could output not only a classification result, but a confidence score reflecting a likelihood that the classification result is accurate. Security device 230 may then use the classification result if the confidence score satisfies a threshold or is greater than the next highest confidence score (e.g., by a particular amount).

In some implementations, security device 230 may identify and/or classify the application based on performing a network protocol decode associated with the traffic, and maintaining a state machine corresponding to the network protocol in question.

As further shown in FIG. 4A, process 400 may include determining a reputation score associated with the endpoint (block 420). For example, security device 230 may determine the reputation score based on identifying and/or classifying the application associated with the endpoint.

A reputation score may include information that identifies a relative reputation (i.e., a degree of trustworthiness) of the endpoint associated with the session. For example, the reputation score may include a numerical value (e.g., from 1 to 100), a grade (e.g., from A to F), a reputation level (e.g., Poor, Fair, or Good; Trusted or Untrusted, etc.), or the like.

In some implementations, security device 230 may determine the reputation score based on information provided by another device, such as reputation device 240. For example, reputation device 240 may be configured to store reputation scores for a set of endpoints. Here, security device 230 may send, to reputation device 240, a request including information that identifies the endpoint. Reputation device 240 may provide, to security device 230 and in response to the request, information associated with the reputation score.

In some implementations, such a reputation score may be determined based on a machine learning technique, using artificial intelligence, based on a model, or the like. In some implementations, factors that may impact the reputation score may include whether the endpoint is identified in a known white-list, whether the endpoint is identified in a known black-list, based on information associated with other security device that have processed traffic associated with the endpoint, based on information indicating that the endpoint has been associated with suspicious activity in the past, or the like.

In some implementations, reputation device 240 may be an external device that provides reputation scores as a service (e.g., a device that makes reputation scores publicly available or a device that makes reputation scores available for a fee). Additionally, or alternatively, reputation device 240 may be an internal device (e.g., managed by a service provider associated with security device 230 or implemented within security device 230).

In some implementations, security device 230 may determine multiple reputation scores for an endpoint (e.g., based on information provided by multiple reputation devices 240). In such cases, security device 230 may determine a composite reputation score. For example, security device 230 may normalize the multiple reputation scores and compute an average or a weighted average (e.g., where reputations scores from different reputation devices 240 are assigned different weights) of the multiple reputation scores, and may determine the composite reputation score as a reputation score that is equal to the average or the weighted average. As an alternative example, security device 230 may determine a composite reputation score as being equal to a highest, a lowest, a median, or a mode reputation score of the multiple reputation scores received by security device 230.

As further shown in FIG. 4A, process 400 may include determining whether the reputation score, associated with the endpoint, satisfies a reputation threshold (block 425). For example, security device 230 may determine whether the reputation score, associated with the endpoint, satisfies the reputation threshold.

The reputation threshold may include a threshold that indicates a level of trustworthiness required to cache the classification result associated with the endpoint. For example, if the reputation threshold is not satisfied (e.g., indicating that the endpoint is not trustworthy), then the classification result may not be cached. Alternatively, if the reputation threshold is satisfied (e.g., indicating that the endpoint is trustworthy), then the classification result may be cached. In some implementations, the reputation threshold may be configurable (e.g., by a user of security device 230).

In some implementations, security device 230 may compare the reputation score and the reputation threshold. Here, security device 230 may determine that the reputation threshold is satisfied when, for example, the reputation score meets or exceeds the reputation threshold (e.g., when a numerical reputation score is greater than or equal to a numerical threshold, when a reputation level or grade is at or above a threshold reputation level or grade threshold, or the like). Alternatively, security device 230 may determine that the reputation threshold is not satisfied when, for example, the reputation score does not meet or exceed the reputation threshold (e.g., when the numerical reputation score is less than the numerical threshold, when the reputation level or grade is below the reputation level or grade threshold, or the like).

As further shown in FIG. 4A, if the reputation score satisfies the reputation threshold (block 425—YES), then process 400 may include determining whether an instance of suspicious activity, associated with the endpoint, has occurred (block 430). For example, security device 230 may determine whether an instance of suspicious activity, associated with server device 220, has occurred.

An instance of a suspicious activity may include participation in a suspicious activity by the endpoint, such as a malicious activity detected by an advance threat protection service, an instance of application flipping associated with the endpoint, an activity that resulted in the endpoint being added to a black-list, or the like.

In some implementations, security device 230 may determine whether an instance of suspicious activity has occurred based on information associated with a security service provided by security device 230. For example, a security service, hosted by security device 230, may detect an instance of suspicious activity, and store information associated with the instance of suspicious activity, including information that identifies the endpoint associated with the suspicious activity. Here, security device 230 may search such stored information using the information that identifies the endpoint, and determine whether an instance of suspicious activity has occurred based on a result of the search.

Additionally, or alternatively, security device 230 may determine whether an instance of suspicious activity has occurred based on information provided by another device, such as reputation device 240 (e.g., when reputation device 240 stores or has access to information associated with suspicious activities of one or more endpoints).

Additionally, or alternatively, security device 230 may determine whether an instance of suspicious activity has occurred based on information provided by other security devices 230. For example, security device 230 may have access to information associated with a group of security devices 230, where information associated with instances of suspicious activity, detected by the other security devices, are stored (e.g., in a data structure).

In some implementations, security device 230 may request such information from reputation device 240 and/or another security device 230, and may receive the information in response to the request.

As further shown in FIG. 4A, if an instance of suspicious activity, associated with the endpoint, has not occurred (block 430—NO), then process 400 may include caching a classification result associated with the endpoint (block 435). For example, if an instance of suspicious activity has not occurred, then security device 230 may cache (i.e., store) the classification result associated with the endpoint.

In some implementations, security device 230 may store a classification result in an application cache associated with a storage component of security device 230. As described above, the classification result may include information that identifies an endpoint associated with a session (e.g., an IP address), information that identifies a port associated with the endpoint (e.g., a port number), information that identifies a transport protocol associated with traffic of the session, information that identifies a virtual routing instance, information associated with an application (e.g., an application type, an application name), or the like. In some implementations, security device 230 may store the reputation score associated with the classification result. Security device 230 may then proceed with determining a security policy based on the classification result, and proceed with processing the traffic according to the security policy. In some implementations, security device 230 may use the cached classification result to bypass identification and/or classification of other traffic, associated with the endpoint, at a later time (e.g., as described elsewhere herein). This may result in reduced consumption of processor resources of security device 230 and/or improved and/or more efficient operation of security device 230 (e.g., as compared to classifying an application for each traffic flow).

As further shown in FIG. 4A, if the reputation score does not satisfy the reputation threshold (block 425—NO) or an instance of suspicious activity, associated with the endpoint, has occurred (block 430—YES), then process 400 may include discarding the classification result associated with the endpoint (block 440). For example, if the reputation score satisfies the reputation threshold or an instance of suspicious activity has occurred, then security device 230 may discard (i.e., not cache) the classification result.

In some implementations, security device 230 may continue to classify and/or identify an application, based on other traffic associated with the endpoint, as a result of not storing the classification result. As such, security device 230 may reduce a likelihood of application cache poisoning associated with the endpoint, which increases network security and/or efficacy of the application cache. In some implementations, security device 230 may store information indicating that the endpoint is non-cacheable (e.g., such that a classification result, associated with the endpoint, may not be cached at a later time).

As further shown in FIG. 4A, if the endpoint is identified in the application cache (block 410—YES), then process 400 may include determining whether sufficient resources are available to re-classify the application associated with the endpoint (block 445), as shown in FIG. 4B. For example, if the endpoint is identified in the application cache, then security device 230 may determine whether sufficient resources are available to re-classify the application associated with the endpoint.

In some implementations, security device 230 may determine whether sufficient resources are available based on a resource threshold associated with security device 230. The resource threshold may include information that identifies an amount of available resources (e.g., processor resources, memory resources, or the like) needed to trigger security device 230 to re-classify the application associated with the endpoint. In some implementations, security device 230 may identify the resource threshold based on user input, based on a configuration of security device 230, based on information provided by another device, or the like.

For example, the resource threshold may include information that identifies a threshold amount of resources (e.g., a percentage of total resources, a particular quantity of resources, or the like). Security device 230 may then compare the amount of available resources and the resource threshold. The resource threshold is determined to be satisfied when, for example, the amount of available resources is greater than or equal to the resource threshold (e.g., when 85% of CPU resources are not in use and the resource threshold is 80% of CPU resources, the resource threshold is satisfied). The resource threshold is determined not to be satisfied when, for example, the amount of available resources is less than the resource threshold (e.g., when 20 megabytes (MB) of RAM are not in use and the resource threshold is 100 MB of RAM, the resource threshold is not satisfied).

In some implementations, the resource threshold may be implemented to cause security device 230 to re-classify the application when security device 230 is using a relatively low amount of resources. In this way, re-classification may be performed (even when not otherwise needed) in order to further improve network security and/or reduce a likelihood of cache poisoning. In some implementations, the resource threshold may be combined with a time threshold that identifies a minimum amount of time between re-classifications (e.g., in order to avoid resource waste due to frequent re-classifications)

As further shown in FIG. 4B, if sufficient resources are not available to re-classify the application associated with the endpoint (block 445—NO), then process 400 may include determining whether a classification threshold, associated with classifying the application, has been satisfied (block 450). For example, if sufficient resources are not available, then security device 230 may determine whether the classification threshold has been satisfied.

The classification threshold may include information that identifies a number of classification results, associated with an endpoint, to be determined by security device 230 before caching a classification result associated with the endpoint (i.e., information that identifies a threshold number of times that the classification results, associated with the endpoint, are to be determined). For example, the classification threshold may include information, that identifies a number of classification results (e.g., three, five, ten, or the like) associated with the endpoint, that security device 230 is to determine before caching a classification result associated with the endpoint.

In some implementations, security device 230 may be configured to identify and/or classify the application associated with the endpoint (e.g., a server device 220), for traffic associated with at least two different sessions (e.g., at least two traffic flows) and/or at least two different devices (e.g., a session associated with each of two different client devices 210). Here, security device 230 may track a number of classification results associated with the endpoint, such that security device 230 may identify the number of classification results previously determined. For example, in some implementations, security device 230 may store information that associates the number of classification results with the endpoint. Security device 230 may then compare the number of classification results to the classification threshold. The classification threshold is determined to be satisfied when, for example, the number of classification results is greater than or equal to the classification threshold. The classification threshold is determined to not be satisfied when, for example, the number of classification results is less than the classification threshold.

In some implementations, the classification threshold may be implemented to cause security device 230 to classify the application, associated with the endpoint, multiple times before caching a classification result, thereby further reducing a likelihood of cache poisoning.

As further shown in FIG. 4B, if the classification threshold has been satisfied (block 450—YES), then process 400 may include determining whether a random re-classification and/or a periodic re-classification is to be performed (block 455). For example, if the classification threshold has been satisfied, then security device 230 may determine whether a random re-classification and/or a periodic re-classification is to be performed.

A random and/or periodic re-classification may include a re-classification of the application associated with the endpoint, that occurs on a random basis, a periodic basis, or the like. For example, security device 230 may generate a random value (e.g., from 0.1 to 1.0). Here, if the random value is within a particular range of values (e.g., from 0.1 to 0.3), then security device 230 may determine that security device 230 is to re-classify the application. Alternatively, if the random value is not within the particular range, then security device 230 may not re-classify the application.

As another example, security device 230 may maintain a timer associated with a cached classification result. Here, security device 230 may determine that security device 230 is to re-classify the application based on the timer, when a particular amount of time (e.g., 5 minutes) has passed since the classification result was cached. Use of such a timer may ensure that security device 230 periodically inspects the cached classification result, which may reduce a likelihood of cache poisoning.

As another example, security device 230 may maintain a counter that tracks a number of traffic flows associated with the endpoint. Here, security device 230 may determine that security device 230 is to re-classify the application based on the counter, after every $N^{th}$ (e.g., fifth, tenth, or the like) traffic flow associated with the endpoint. Use of such a counter may ensure that security device 230 periodically inspects the cached classification result, which may reduce a likelihood of cache poisoning.

As another example, security device 230 may maintain a counter that tracks a rate and/or a number of threats detected by security device 230 (e.g., associated with any endpoint). Here, security device 230 may determine that security device 230 is to re-classify the application based on the counter (e.g., when the rate of threats satisfies a threshold, when the number of threats satisfies a threshold, or the like). Use of such a counter may ensure that security device 230 aggressively inspects the cached classification result in response to threats detected by security device 230, which may reduce a likelihood of cache poisoning.

In some implementations, security device 230 may determine whether security device 230 is to perform the random and/or periodic re-classification in order to reduce a likelihood of an undetected instance of application cache poisoning remaining in the application cache, thereby reducing a likelihood of persistent cache poisoning. This improves performance of security device 230.

In some implementations, blocks 445, 450, and/or 455 may be performed concurrently or in a different order than described in FIG. 4B. Additionally, in some implementations, process 400 may include each of blocks 445, 450, and 455, or any combination of one or two of blocks 445, 450, and 455.

As further shown in FIG. 4B, if a random re-classification and/or a periodic re-classification is not to be performed (block 455—NO), then process 400 may include using a cached classification result to classify and/or identify the application (block 460). For example, if a random re-classification and/or a periodic re-classification is not to be performed, then security device 230 may use the cached classification result to classify and/or identify the application.

In some implementations, security device 230 may proceed with determining a security policy based on the cached classification result, and proceed with processing the traffic according to the security policy. In this way, security device 230 may bypass re-classifying the application, thereby conserving processor resources.

As further shown in FIG. 4B, if sufficient resources are available to re-classify the application (block 445—YES), the classification threshold has not been satisfied (block 450—NO), and/or a random re-classification and/or a periodic re-classification is to be performed (block 455—YES), then process 400 may include re-classifying the application associated with the endpoint (block 465). For example, if sufficient resources are available to re-classify the application, the classification threshold has not been satisfied, or a random re-classification and/or a periodic re-classification is to be performed, then security device 230 may re-classify the application associated with the endpoint.

In some implementations, security device 230 may re-classify the application associated with the endpoint in a manner similar to that which security device 230 classifies and/or identifies the application as described above with regard to block 415.

As further shown in FIG. 4B, process 400 may include determining whether a re-classification result matches the cached classification result (block 470). For example, security device 230 may determine whether a re-classification result matches the cached classification result.

In some implementations, security device 230 may determine whether the re-classification result matches the cached classification result by comparing information that identifies the application and/or the application type, as indicated by the cached classification result, with information that identifies the application and/or the application type as indicated by the re-classification result.

Additionally, or alternatively, security device 230 may compare one or more other items of information included in the classification result and the re-classification result (e.g., information that identifies the port identifier, information that identifies the transport protocol, or the like).

In some implementations, security device 230 may determine that the re-classification result matches the classification result when the information that identifies the application, the application type, the port, and/or the transport protocol is the same in the cached classification result and the re-classification result.

Alternatively, security device 230 may determine that the re-classification result does not match the classification result when the information that identifies the application, the application type, the port, and/or the transport protocol is not the same in the cached classification result and the re-classification result. In some implementations, mismatching classification results may be indicative of suspicious activity associated with the endpoint, such as application flipping. Thus, by comparing the re-classification result and the cached classification result, security device 230 may prevent cache poisoning associated with the endpoint.

As further shown in FIG. 4B, if the re-classification result matches the cached classification result (block 470—YES), then process 400 may include using the cached classification result to classify and/or identify the application (block 460).

In some implementations, security device 230 may use the cached classification result by proceeding with determining a security policy based on the classification result, and processing the traffic according to the security policy. In this way, security device 230 may bypass re-classifying the application, thereby conserving processor resources, as described above.

As further shown in FIG. 4B, if the re-classification result does not match the cached classification result (block 470—NO), then process 400 may include removing the cached classification result and not caching the re-classification result (block 475).

In some implementations, security device 230 may remove the cached classification result in order to cause security device 230 to re-classify the application, associated with the endpoint, for a future traffic flow (e.g., since the cached classification entry may no longer be valid). In some implementations, security device 230 may store information indicating that the endpoint is non-cacheable (e.g., such that a classification result associated with the endpoint, may not be cached at a later time or for a period of time). In this way, security device 230 may protect the application cache from being poisoned by endpoints that may be associated with suspicious activity.

In this way, security device 230 may dynamically update the application cache based on a reputation of the endpoint and/or one or more other factors. This may allow security device 230 to detect an instance of suspicious activity and reduce a likelihood of application cache poisoning associated with the endpoint.

Although FIGS. 4A and 4B shows example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

Figure 5:
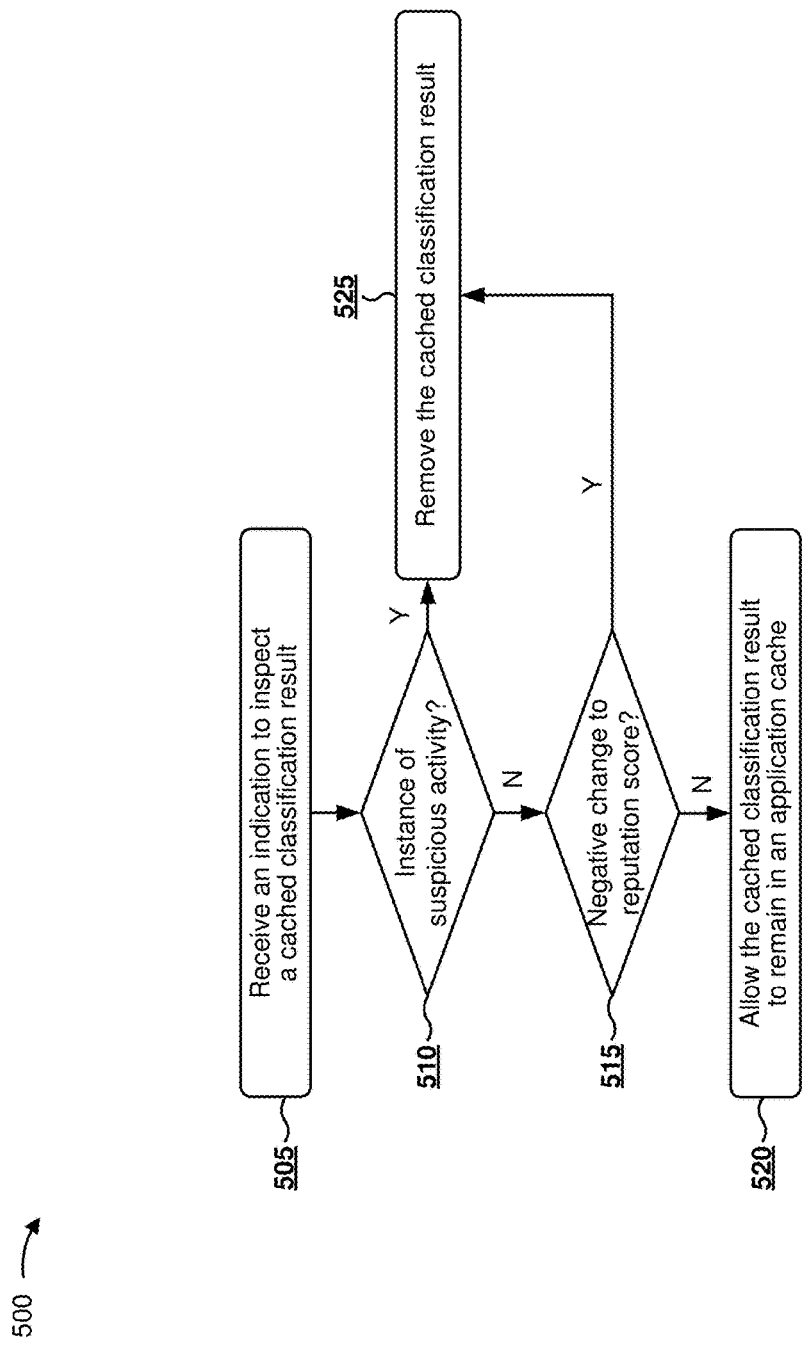
FIG. 5 is a flow chart of an example process for selectively removing a cached classification result from a reputation-based application cache.

FIG. 5 is a flow chart of an example process 500 for selectively removing a cached classification result from a reputation-based application. In some implementations, one or more process blocks of FIG. 5 may be performed by security device 230. In some implementations, one or more process blocks of FIG. 5 may be performed by another device or a group of devices separate from or including security device 230, such as client device 210, server device 220, and/or reputation device 240.

As shown in FIG. 5, process 500 may include receiving an indication to inspect a cached classification result (block 505). For example, in some implementations, security device 230 may inspect a cached classification result, associated with an endpoint of a session, in order to determine whether the cached classification result should be removed from the application cache.

In some implementations, security device 230 may receive the indication based on a timer associated with the cached classification result and/or the endpoint. For example, security device 230 may be configured to periodically inspect each cached classification result (e.g., once every hour, once every day).

Additionally, or alternatively, security device 230 may randomly select the cached classification result for inspection (e.g., when security device 230 is configured to randomly inspect a particular number of cached classification results every hour, every day, or the like). Additionally, or alternatively, security device 230 may receive the indication based on user input.

Additionally, or alternatively, security device 230 may determine that security device 230 is to inspect the cached classification result based on an amount of memory storage available to security device 230 (e.g., where security device 230 may more frequently inspect cached classification results when security device 230 has limited memory resources available).

Additionally, or alternatively, security device 230 may determine that security device 230 is to inspect the cached classification result when an amount of resources available to security device 230 satisfies a threshold, as described above (e.g., when more than 80% of processor resources are available, security device 230 may inspect a random cached classification result).

As further shown in FIG. 5, process 500 may include determining whether an instance of suspicious activity, associated with the endpoint, has occurred (block 510). For example, security device 230 may determine whether an instance of suspicious activity, associated with the endpoint, has occurred, in the manner described above with regard to block 430.

As further shown in FIG. 5, if an instance of suspicious activity, associated with the endpoint, has not occurred (block 510—NO), then process 500 may include determining whether a reputation score, associated with the endpoint, has changed in a negative manner (block 515).

In some implementations, security device 230 may determine whether the reputation score has changed in a negative manner (e.g., indicating a decreased level of trustworthiness) based on a current reputation score and a reputation score associated with the cached classification result. For example, security device 230 may determine a reputation score associated with the cached classification result based on information stored by security device 230 (e.g., when security device 230 stores the reputation score based on caching the classification result, as described above). Here, security device 230 may determine a current reputation score in the manner described above with regard to block 420. Security device 230 may then compare the reputation score, associated with the cached classification result, and the current reputation score and determine whether the reputation score has changed in a negative manner, accordingly. For example, security device 230 may determine that the reputation score has changed in a negative manner when the current reputation score is below (e.g., less than, below, worse than, or the like) the reputation score associated with the cached classification result (e.g., by any amount, by a threshold amount, by a particular percentage, by a threshold number of levels or grades, or the like). In some implementations, security device 230 may determine whether the reputation score has changed in a negative manner based on compare the current reputation score to two or more previous reputation scores (e.g., individually, an average, a weighted average, or the like).

As further shown in FIG. 5, if the reputation score has not changed in a negative manner (block 515—NO), then process 500 may include allowing the cached classification result to remain in the application cache (block 520). For example, if the reputation score has not changed in a negative manner, then security device 230 may allow the cached classification result to remain in the application cache and may continue to use the cached classification result to classify and/or identify the application associated with the endpoint.

As further shown in FIG. 5, if an instance of suspicious activity, associated with the endpoint, has occurred (block 510—YES), or the reputation score has changed in a negative manner (block 515—YES), then process 500 may include removing the cached classification result from the application cache (block 525). For example, security device 230 may remove the cached classification result in order to cause security device 230 to re-classify the application, associated with the endpoint, for a future traffic flow (e.g., since the cached classification entry may no longer be valid). In some implementations, security device 230 may also store information indicating that the endpoint is non-cacheable.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In some implementations, the above-described techniques may be performed in association with a white-list of approved and/or trusted endpoints. For example, security device 230 may identify an endpoint, associated with a session, as being included in a white-list. Here, security device 230 may determine a reputation score associated with the endpoint (e.g., as described above with regard to block 420). Security device 230 may then determine whether the reputation score satisfies a threshold (e.g., as described above with regard to block 425). Here, if the reputation score does not satisfy the reputation threshold, then security device 230 may remove the endpoint from the white-list.

Alternatively, if the reputation score satisfies the reputation threshold, then security device 230 may allow the endpoint to remain on the white-list.

In this way, security device 230 may check the reputation of the endpoint before allowing the traffic, associated with the endpoint, to bypass a security service. Modification of an otherwise static white-list allows security device 230 to dynamically adapt to behavior of the endpoint in order to improve network security.

In some implementations, security device 230 may implement one or more other described techniques to management of the white-list, such as determining whether the endpoint has been associated with suspicious activity (e.g., as described above with regard to block 430), and updating the white-list accordingly (e.g., removing and endpoint when there is an instance of suspicious activity, allowing and endpoint to remain when there is no instance of suspicious activity).

The various implementations described above provide for a security device capable of managing a reputation-based application cache that includes a set of classification results approved for caching based on reputations of endpoints associated with the set of classification results. The reputation-based application cache reduces vulnerability of the application cache to cache poisoning while improving performance of the security device. The security device is also capable of managing a reputation-based white-list that includes information that identifies a set of trusted endpoints deemed trustworthy based on reputations of the set of endpoints. The reputation-based white-list checking reduces vulnerability resulting from use of the white-list, also while improving performance of the security device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
 a memory; and
 one or more processors to:
   classify an application, associated with an endpoint, based on traffic associated with the endpoint;
   send, to another device that has processed other traffic associated with the endpoint, a request for information regarding a reputation of the endpoint;
   receive, from the other device based on the request, the information,
     the information including at least one of:
       a first indication that the endpoint is identified in a white-list, or
       a second indication that the endpoint is identified in a black-list;
   determine, based on receiving the information from the other device, a first reputation score associated with the endpoint,
     the first reputation score being indicative of a level of trustworthiness of the endpoint;
   determine whether the first reputation score satisfies a threshold;
   selectively store a classification result, associated with classifying the application, in an application cache based on the first reputation score satisfying the threshold;
   determine a security policy based on the classification result;
   process the traffic using the security policy;
   receive an indication to inspect the classification result stored in the application cache;
   determine a second reputation score associated with the endpoint;
   compare the second reputation score and the first reputation score; and
   selectively remove the classification result from the application cache based on comparing the second reputation score and the first reputation score.

2. The device of claim 1, where the one or more processors are further to:
 determine whether an instance of suspicious activity, associated with the endpoint, has occurred; and
 where the one or more processors, when selectively storing the classification result, are to:
   selectively store the classification result based on whether an instance of suspicious activity, associated with the endpoint, has occurred.

3. The device of claim 1, where the one or more processors are further to:
  determine that the first reputation score does not satisfy the threshold; and
  where the one or more processors, when selectively storing the classification result, are to:
    discard the classification result, without storing the classification result in the application cache, based on determining that the first reputation score does not satisfy the threshold.

4. The device of claim 1,
  where the classification result includes information that identifies the endpoint.

5. The device of claim 1, where the one or more processors, are further to:
  determine, based on additional traffic associated with the endpoint and based on storing the classification result, that the endpoint is identified in the application cache;
  determine, based on determining that the endpoint is identified in the application cache, that the application is to be re-classified;
  re-classify the application; and
  selectively remove the classification result from the application cache based on re-classifying the application.

6. The device of claim 5, where the one or more processors are further to:
  determine that a threshold amount of resources, associated with the device, is available; and
  where the one or more processors, when determining that the application is to be re-classified, are to:
    determine that the application is to be re-classified based on determining that the threshold amount of resources are available.

7. The device of claim 5, where the one or more processors are further to:
  determine that the application has not been classified a threshold number of times; and
  where the one or more processors, when determining that the application is to be re-classified, are to:
    determine that the application is to be re-classified based on determining that the application has not been classified the threshold number of times.

8. The device of claim 5, where the one or more processors are further to:
  determine that a random re-classification or a periodic re-classification is to be performed; and
  where the one or more processors, when determining that the application is to be re-classified, are to:
    determine that the application is to be re-classified based on determining that the random re-classification or the periodic re-classification is to be performed.

9. The device of claim 5, where the one or more processors are further to:
  determine whether a re-classification result, associated with re-classifying the application, matches the classification result; and
  where the one or more processors, when selectively removing the classification result from the application cache, are to:
    selectively remove the classification result based on whether the re-classification result matches the classification result.

10. A non-transitory computer-readable medium storing instructions, the instructions comprising:
  one or more instructions that, when executed by one or more processors of a device, cause the one or more processors to:
    classify an application, associated with an endpoint, based on first traffic associated with the endpoint;
    send, to another device that has processed second traffic associated with the endpoint, a request for information regarding a reputation of the endpoint;
    receive, from the other device based on the request, the information,
      the information including at least one of:
        a first indication that the endpoint is identified in a white-list, or
        a second indication that the endpoint is identified in a black-list;
    determine, based on receiving the information from the other device, a first reputation score associated with the endpoint;
    determine whether the first reputation score satisfies a threshold;
    selectively store a classification result, associated with classifying the application, in an application cache, based on the first reputation score satisfying the threshold;
    determine a security policy based on the classification result;
    process the first traffic using the security policy;
    receive an indication to inspect the classification result stored in the application cache;
    determine a second reputation score associated with the endpoint;
    compare the second reputation score and the first reputation score; and
    selectively remove the classification result from the application cache based on comparing the second reputation score and the first reputation score.

11. The non-transitory computer-readable medium of claim 10, where the one or more instructions, when executed by the one or more processors, further cause the one or more processors to:
  determine, based on third traffic associated with the endpoint and based on the classification result, that the endpoint is identified in the application cache;
  determine that a threshold amount of resources, associated with performing re-classification, is available;
  determine that the application is to be re-classified determining that the endpoint is identified in the application cache and based on determining that the threshold amount of resources are available;
  re-classify the application; and
  selectively remove the classification result from the application cache based on re-classifying the application.

12. The non-transitory computer-readable medium of claim 11, where the one or more instructions, when executed by the one or more processors, further cause the one or more processors to:
  determine that the application has not been classified a threshold number of times; and
  where the one or more instructions, that cause the one or more processors to determine that the application is to be re-classified, cause the one or more processors to:
    determine that the application is to be re-classified based on determining that the application has not been classified the threshold number of times.

13. The non-transitory computer-readable medium of claim 11, where the one or more instructions, when executed by the one or more processors, further cause the one or more processors to:
  determine that a random re-classification or a periodic re-classification is to be performed; and
  where the one or more instructions, that cause the one or more processors to determine that the application is to be re-classified, cause the one or more processors to:
    determine that the application is to be re-classified based on determining that the random re-classification or the periodic re-classification is to be performed.

14. The non-transitory computer-readable medium of claim 11, where the one or more instructions, when executed by the one or more processors, further cause the one or more processors to:
  determine whether a re-classification result, associated with re-classifying the application, matches the classification result; and
  where the one or more instructions, that cause the one or more processors to selectively remove the classification result from the application cache, cause the one or more processors to:
    selectively remove the classification result based on whether the re-classification result matches the classification result.

15. A method, comprising:
  classifying, by a device, an application, associated with an endpoint, based on traffic associated with the endpoint;
  sending, by the device to another device that has processed other traffic associated with the endpoint, a request for information regarding a reputation of the endpoint;
  receiving, by the device from the other device based on the request, the information,
    the information including at least one of:
      a first indication that the endpoint is identified in a white-list, or
      a second indication that the endpoint is identified in a black-list;
  determining, by the device and based on receiving the information from the other device, a first reputation score, associated with the endpoint, that is indicative of a level of trustworthiness of the endpoint;
  determining, by the device, whether the first reputation score satisfies a threshold; and selectively:
    selectively storing, by the device, a classification result, associated with classifying the application, in an application cache based on the first reputation score satisfying the threshold,
    determining, by the device, a security policy based on the classification result,
    processing, by the device, the traffic using the security policy;
    receiving, by the device, an indication to inspect the classification result stored in the application cache;
    determining, by the device, a second reputation score associated with the endpoint;
    comparing, by the device, the second reputation score and the first reputation score; and
    selectively removing, by the device, the classification result from the application cache based on comparing the second reputation score and the first reputation score.

16. The method of claim 15, further comprising:
  determining whether an instance of suspicious activity, associated with the endpoint, has occurred; and
  where storing the classification result comprises:
    storing the classification result in the application cache based on whether an instance of suspicious activity, associated with the endpoint, has occurred.

17. The method of claim 15, further comprising:
  determining a plurality of reputation scores associated with the endpoint; and
  where determining the first reputation score comprises:
    determining the first reputation score based on the plurality of reputation scores.

18. The method of claim 15, further comprising:
  discarding the classification result based on the first reputation score not satisfying the threshold; and
  storing information indicating that another classification result, associated with the endpoint, is not permitted to be cached at a later time.

19. The device of claim 1, where the one or more processors, when selectively removing the classification result from the application cache based on comparing the second reputation score and the first reputation score, are to:
  allow the classification result to remain in the application cache based on determining that the second reputation score is not below the first reputation score.

20. The non-transitory computer-readable medium of claim 10, where the one or more instructions, that cause the one or more processors to selectively remove the classification result from the application cache based on comparing the second reputation score and the first reputation score, cause the one or more processors to:
  allow the classification result to remain in the application cache based on determining that the second reputation score is not below the first reputation score.

* * * * *